US006933262B1

(12) United States Patent
Chesser et al.

(10) Patent No.: US 6,933,262 B1
(45) Date of Patent: *Aug. 23, 2005

(54) CONTROLLED HYDRATION OF STARCH IN HIGH DENSITY BRINE DISPERSION

(75) Inventors: Billy G. Chesser, Cold Springs, TX (US); Gregory A. Mullen, Houston, TX (US); Dave Clark, Humble, TX (US)

(73) Assignee: Baker Hughes Incorporated, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 958 days.

(21) Appl. No.: 08/869,109

(22) Filed: Jun. 4, 1997

Related U.S. Application Data

(60) Provisional application No. 60/039,614, filed on Mar. 18, 1997.

(51) Int. Cl.[7] ................................................ C09K 3/00
(52) U.S. Cl. ...................... 507/212; 507/111; 507/925; 507/926
(58) Field of Search ................................ 507/212, 111, 507/925, 926

(56) References Cited

U.S. PATENT DOCUMENTS

| | | |
|---|---|---|
| 2,417,235 A | 3/1947 | Cannon |
| 3,872,018 A | 3/1975 | Alexander |
| 3,993,570 A | 11/1976 | Jackson et al. |
| 4,003,838 A | 1/1977 | Jackson et al. |
| 4,090,968 A | 5/1978 | Jackson et al. |
| 4,175,042 A * | 11/1979 | Mondshine .................. 507/111 |
| 4,422,947 A * | 12/1983 | Dorsey et al. .............. 507/111 |
| 4,427,556 A | 1/1984 | House et al. |
| 4,574,887 A | 3/1986 | Abdo |
| 5,009,267 A * | 4/1991 | Williamson et al. ........ 166/271 |
| 5,612,293 A * | 3/1997 | Swartwout et al. ......... 507/110 |
| 5,616,541 A | 4/1997 | Dobson, Jr. et al. |
| 5,641,728 A | 6/1997 | Dobson, Jr. et al. |

FOREIGN PATENT DOCUMENTS

| | | |
|---|---|---|
| DE | 240 559 A1 | 11/1986 |
| DE | 240559 * | 11/1986 |
| GB | 1499034 | 1/1978 |
| GB | 1549734 | 8/1979 |
| GB | 2084586 A | 4/1982 |
| WO | WO 97/26311 | 7/1997 |

* cited by examiner

Primary Examiner—Cynthia H. Kelly
(74) Attorney, Agent, or Firm—The Morris Law Firm P.C.

(57) ABSTRACT

A method for producing a precursor polymer dispersion for addition to a brine for use in drilling and completion operations comprising providing a precursor brine having a first salt content, and mixing a water-soluble polymer with the precursor brine at a sufficient concentration and under conditions sufficient to produce a precursor polymer dispersion effective at a sufficient concentration in a final brine having a second salt content to improve the rheology and/or fluid loss control properties of the final brine.

49 Claims, No Drawings

CONTROLLED HYDRATION OF STARCH IN HIGH DENSITY BRINE DISPERSION

This application claims the benefit of Ser. No. 60/039,614, filed on Mar. 18, 1997.

FIELD OF THE INVENTION

The present invention relates to brines used during drilling and completion operations. More particularly, the invention relates to preparation of water soluble polymers to be used in high density drilling, drill-in, and completion brines.

BACKGROUND OF THE INVENTION

Drilling operations typically involve mounting a drill bit on the lower end of a drill pipe or "drill stem" and rotating the drill bit against the bottom of a hole to penetrate a formation, creating a borehole. A drilling fluid—typically a drilling mud—may be circulated down through the drill pipe, out the drill bit, and back up to the surface through the annulus between the drill pipe and the borehole wall. The drilling fluid has a number of purposes, including cooling and lubricating the bit, carrying the cuttings from the hole to the surface, and exerting a hydrostatic pressure against the borehole wall to prevent the flow of fluids from the surrounding formation into the borehole.

A drilling fluid with a relatively high viscosity at high shear rates can place undesirable mechanical constraints on the drilling equipment and may even damage the reservoir. Higher viscosity fluids also exert higher pressures outward on the borehole, which may cause mechanical damage to the formation and reduce the ability of the well to produce oil or gas. Higher viscosity fluids also may fracture the formation, requiring a drilling shut down in order to seal the fracture.

Damage to a reservoir is particularly harmful if it occurs while drilling through the "payzone," or the zone believed to hold recoverable oil or gas. In order to avoid such damage, a different fluid—known as a "drill-in" fluid—is pumped through the drill pipe while drilling through the payzone.

Another type of fluid used in oil and gas wells is a "completion fluid." A completion fluid is pumped down a well after drilling operations are completed and during the "completion phase." Drilling mud typically is removed from the well using "completion fluid," which typically is a clear brine. Then, the equipment required to produce fluids to the surface is installed in the well.

The viscosity of a drilling or completion brine typically is maintained using polymers, such as starches, derivatized starches, gums, derivatized gums, and cellulosics. Although these polymers are water-soluble, they have a relatively low hydration rate in brines because very little water actually is available to hydrate the polymers, particularly in high density brines.

Heating a brine to at least about 140° F. will increase the hydration rate of starches and/or other water-soluble polymers in the brine. However, heating of brine is time consuming, expensive, and difficult to achieve in the field. Plus, heating of a brine will cause starch dispersed in the brine to build excessive viscosity when subjected to high wellbore temperatures.

Less time consuming and expensive methods that will effectively hydrate water-soluble polymers in high density brines without adversely affecting downhole viscosity are sorely needed.

SUMMARY OF THE INVENTION

The present invention provides a method for producing a precursor polymer dispersion for addition to a brine for use in drilling and completion operations comprising providing a precursor brine having a first salt content, and mixing a water-soluble polymer with the precursor brine at a sufficient concentration and under conditions sufficient to produce a precursor polymer dispersion effective at a sufficient concentration in a final brine having a second salt content to improve the rheology and/or fluid loss control properties of the final brine.

DETAILED DESCRIPTION OF THE INVENTION

A desirable characteristic of any drilling fluid, including a brine, is the ability to flow easily at high velocities even at fluid densities in excess of 17 lb/gal. In rheological terms, the fluid should have a relatively low plastic viscosity, preferably less than about 50, more preferably less than about 40, and most preferably less than about 30. Another desirable rheological property is yield point, which should be at least about 5, preferably from about 5 to 30 lb/100 ft$^2$.

Water-soluble polymers, such as starches, normally are added to brines as dry powders or in a non-hydrating carrier fluid, such as tripropylene glycol. The starches are not prehydrated. The resulting viscosity and filtration control is determined by the interaction of the starch and brine, which in most cases is essentially none at ambient temperature. However, the viscosity may become excessive and even uncontrollable at elevated wellbore temperatures.

According to the present invention, adequate rheological properties and filtration control are attained without heating of a high density brine by forming a precursor polymer dispersion of the water-soluble polymers in a precursor brine before adding the polymers to the final brine. Exposure of the precursor polymer dispersion to temperatures as high as about 150–225° F. before use does not cause the excessive viscosity increase seen when the final brine, itself, is heated to such temperatures before use.

The invention is particularly important to high density brines because the degree of dispersion of dry starch particles, and the subsequent degree of hydration of such particles, is the controlling factor in how the starch performs in a high density brine. Where a brine is high density, e.g., 11.6 lb/gal $CaBr_2$, the initial particle dispersion of the starch is limited. As a result, a significant particle size is maintained and the degree of hydration is limited. These limitations are alleviated if the starch is dispersed in the brine in the manner herein described.

Brines that are useful in the present invention can contain substantially any suitable salts, including, but not necessarily limited to salts based on alkaline earth metals, such as calcium salts, magnesium salts, sodium salts, potassium salts, cesium salts, zinc salts, aluminum salts, and lithium salts. With the exception of sodium and potassium, the salt may contain substantially any anions, with preferred anions being less expensive anions including, but not necessarily limited to chlorides, bromides, formates, propionates, sulfates, acetates, and nitrates. For sodium and potassium, the anion preferably should not be chloride. A preferred brine for forming the prehydrating mixture contains between about 3.5–6.0 lb/gal of calcium bromide.

Although the invention is particularly useful for prehydrating starches, prehydration also should improve the effectiveness of other water-soluble polymers used in brines. As used herein, the term "water-soluble polymers" is defined to mean polymers that are capable of viscosifying the brine and/or providing filtration control for the brine. Such polymers are known in the art. Preferred polymers are non-toxic polymers which include, but are not necessarily limited to water-soluble starches and derivatized versions thereof, water soluble gums and derivatized versions thereof, and water-soluble celluloses, and derivatives thereof. Starches that are suitable for use in the present invention include, but are not necessarily limited to corn based and potato based starches, preferred starches being more temperature stable starches. Gums that are suitable for use in the present invention include, but are not necessarily limited to xanthan gums, wellan gums, scleroglucan gums, and guar gums. The foregoing water-soluble polymers are widely available from commercial sources.

As used herein, the term "derivatized starches" refers to starches and gums that have been derivatized in a manner that renders them inherently non-fermentable in order to avoid the need for a preservative. Water-soluble "derivatized starches" that should operate successfully as water-soluble polymers in brines include, but are not necessarily limited to: hydroxyalkyl starches and gums; starch and gum esters; cross-link starches and gums; hypochlorite oxidized starches and gums; starch and gum phosphate monoesters; cationic starches and gums; starch and gum xanthates; and, dialdehyde starches and gums. These derivatized starches and gums can be manufactured using known means, such as those set forth in detail in Chapter X of *Starch: Chemistry and Technology* 311–388 (Roy L. Whistler, et al. eds., 1984), incorporated herein by reference.

Specific examples of suitable derivatized starches that fall within the foregoing categories include, but are not necessarily limited to: carboxymethyl starches; hydroxyethyl starches; hydroxypropyl starches; hydroxybutyl starches; carboxymethylhydroxyethyl starches; carboxymethylhydroxypropyl starches; carboxymethylhydroxybutyl starches; polyacrylamide starches; and, other starch copolymers.

A preferred water-soluble polymer is a derivatized starch known as BIOPAQ, available from Baker Hughes, Inteq. Both derivatized and non-derivatized starches and gums hereinafter will be referred to as "starches." Unless otherwise specified, the term "starch" or "starches" refers to both derivatized and non-derivatized starches and gums.

In order to prepare the precursor polymer dispersion, between about 0.5–4 lb/gal, preferably between about 1–2 lb/gal of a desired water-soluble polymer is mixed with a brine having a density of between about 9–14 lb/gal, preferably between about 11–13 lb/gal. In a preferred embodiment, about 5 pounds of BIOPAQ is mixed with about 4.2 gallons of calcium bromide brine having a density of about 11.6 lb/gal. In a preferred method, the starch is added to the brine continuously and uniformly while stirring vigorously, e.g., using a paddle mixer at about 300–400 rpm. The starch should be added as quickly as possible before the fluid viscosity increases dramatically; however, slugging in of the starch should be avoided. The resulting dispersion preferably should be pourable at ambient temperature. It may be necessary to subject the dispersion to high shear to improve pourability. Dispersions so prepared should have adequate rheological and filtration control properties even after exposure to aging temperatures of up to about 150–225° F.

The addition of this precursor polymer dispersion to the actual brine will result in a density decrease if the brine density is more than 11.6 lb/gal of salt. The starting brine density will need to be adjusted accordingly, so that the final fluid density is within specification.

The invention will be better understood with reference to the following examples, which are intended to be illustrative only and should not be interpreted as limiting the invention:

EXAMPLE I

A high density brine prepared using a precursor polymer dispersion of the present invention (FLUID A) was compared to a the same brine prepared using a portion of the dry powdered polymer (FLUID B). The following materials were used to make the brines:

|  | FLUID A | FLUID B |
|---|---|---|
| 13.2 lb/gal $CaCl_2$—$CaBr_2$ Brine | 289 cc | 324 cc |
| Attapulgite | 5 g | 5 g |
| MgO | 3 g | 3 g |
| Milcarb (Calcium Carbonate) | 50 g | 50 g |
| BIOPAQ/Brine Dispersion | 119.1 g |  |
| BIOPAQ (powder) |  | 8 g |

The resulting brines exhibited the following properties:

|  | FLUID A | | FLUID B | |
|---|---|---|---|---|
|  | INITIAL | AFTER AGING AT 200° F. | INITIAL | AFTER AGING AT 200° F. |
| 600 rpm | 69 | 79 | 44 | 280 |
| 300 rpm | 45 | 46 | 26 | 198 |
| 200 rpm | 35 | 34 | 19.5 | 162 |
| 100 rpm | 24 | 22 | 12 | 120 |
| 6 rpm | 6.5 | 7 | 3.5 | 47 |
| 3 rpm | 6 | 6.5 | 3 | 41 |
| PV, cp | 24 | 33 | 18 | 82 |
| YP, lb/100 sq. ft. | 21 | 13 | 8 | 116 |
| API Filtrate, cc | 0.1 | 2.3 | 70/15 min. | 0 |

The rheological properties of FLUID A did not change significantly after heat aging at 200° F. and the filtration control was satisfactory before and after heat aging.

The initial yield point (YP) of FLUID B was borderline as to providing sufficient suspension properties and increased to excessive values in plastic viscosity and yield point after heat aging. The filtration control of FLUID B also was unsatisfactory upon initial preparation, as evidenced by the API Filtrate results. The reason for using a higher starch concentration in FLUID B was to improve the initial properties, but the higher starch concentration did not provide adequate improvement.

EXAMPLE II

The following precursor polymer dispersions were prepared:

| Calcium Chloride/Calcium Bromide Brine Dispersion Formulations | | | | | | |
|---|---|---|---|---|---|---|
|  | 1 | 2 | 3 | 4 | 5 | 6 |
| $CaCl_2/CaBr_2$, bbl | 1 | 1 | 1 | 1 | 1 | 1 |
| Density, ppg | 11.6 | 12 | 12.5 | 13 | 13.5 | 14 |
| BIOPAQ, ppb | 50 | 50 | 50 | 50 | 50 | 50 |
| XCD*, ppb | 5 |  |  |  |  |  |

*XCD polymer was obtained from Kelco Rotary, San Diego, California.

The foregoing precursor polymer, dispersions then were used to prepare brines as shown below. All formulations were mixed in 1 bbl equivalents at 6500 rpms for 30 minutes at high shear. All components were added at the beginning of the mix time:

| Brine Formulations | | | | | | |
|---|---|---|---|---|---|---|
| | 1 | 2 | 3 | 4 | 5 | 6 |
| CaCl$_2$/CaBr$_2$, bbl | 0.8 | 0.8 | 0.8 | 0.8 | 0.8 | 0.8 |
| Density, ppg | 13.2 | 13.2 | 13.2 | 13.2 | 13.2 | 13.2 |
| Dispersion, gpb | 5 | 5 | 5 | 5 | 5 | 3.4 |
| Dispersion # | 1 | 2 | 3 | 4 | 5 | 6 |

The resulting brines exhibited the following properties before and after heat aging, respectively:

| Initial Properties | | | | | | |
|---|---|---|---|---|---|---|
| 600, rpm | 63 | 53 | 65 | 53 | 69 | 48 |
| 300, rpm | 37 | 30 | 36 | 30 | 40 | 27 |
| 6, rpm | 4 | 1 | 4 | 1 | 4 | 1 |
| 3, rpm | 3 | 0 | 3 | 1 | 3 | 1 |
| PV, cp | 26 | 23 | 29 | 23 | 29 | 21 |
| YP lb/100 ft$^2$ | 11 | 7 | 7 | 7 | 11 | 6 |
| API, cc/30 min | 0.1 | 0.1 | 0.1 | 0.5 | 0.2 | 0.4 |

| Heat Aged Properties, 16 hr @ 225° F. | | | | | | |
|---|---|---|---|---|---|---|
| 600, rpm | 129 | 125 | 130 | 117 | 140 | 158 |
| 300, rpm | 77 | 75 | 80 | 70 | 87 | 98 |
| 6, rpm | 6 | 5 | 6 | 3 | 7 | 7 |
| 3, rpm | 5 | 3 | 6 | 3 | 7 | 7 |
| PV, cp | 52 | 50 | 50 | 47 | 53 | 60 |
| YP lb/100 ft$^2$ | 25 | 25 | 30 | 23 | 34 | 38 |
| API, cc/30 min | 3.2 | 0.1 | 0.1 | 0.1 | 0.1 | 0.1 |

The rheological properties were satisfactory after heat aging at 225° F. and the filtration control was excellent before and after heat aging (Note that the precursor polymer dispersion prepared in CaCl$_2$/CaBr$_2$ brine was not as effective in building initial rheology as the precursor polymer prepared in CaBr$_2$ brine, but filtration control properties were quite satisfactory).

Many modifications and variations may be made to the embodiments described herein without departing from the spirit of the present invention. The embodiments described herein are illustrative only should not be construed as limiting the scope of the present invention.

We claim:

1. A method for prehydrating a water soluble polymer for addition to a brine for use in drilling and completion operations comprising:
   providing a precursor brine comprising an aqueous solution of a first salt at a first density, said first salt comprising cations consisting essentially of cations of one or more multivalent alkaline earth metals; and
   mixing said water-soluble polymer with said precursor brine at a first concentration and under first conditions, wherein said first density, said first concentration, and said first conditions are effective to produce a precursor polymer dispersion comprising particles of said water-soluble polymer at a level of prehydration;
   wherein, addition of a sufficient quantity of said precursor polymer dispersion to a final brine comprising an aqueous solution of a second salt at a final density produces a final polymer dispersion comprising a second concentration comprising final particles of said water-soluble polymer at a final level of hydration, said second concentration and said final level of hydration being effective at downhole conditions to maintain an effective level of a property of said final brine selected from the group consisting of rheology, fluid loss control, and a combination thereof.

2. The method of claim 1 wherein said first concentration is from about 1 to about 2 lb of said water-soluble polymer per gallon of said precursor brine.

3. The method of claim 1 wherein said salt is selected from the group consisting of calcium chloride, calcium bromide, and combinations thereof.

4. The method of claim 2 wherein said salt is selected from the group consisting of calcium chloride, calcium bromide, and combinations thereof.

5. The method of claim 1 wherein said one or more multivalent alkaline earth metals are divalent alkaline earth metals.

6. The method of claim 1 wherein said density is from about 9 to about 14 pounds per gallon.

7. The method of claim 1 wherein said density is from about 11 to about 13 pounds per gallon.

8. A method for producing a precursor polymer dispersion for addition to a brine for use in drilling and completion operations comprising:
   providing a precursor brine comprising an aqueous solution of a salt at a first density, said salt comprising cations consisting essentially of cations of one or more multivalent alkaline earth metals; and
   mixing a first concentration of a water-soluble polymer with said precursor brine under first conditions, wherein said first concentration is from about 0.5 pounds per gallon to about 4 pounds of said water-soluble polymer per gallon of said precursor brine, wherein said first density, said first concentration, and said first conditions are effective to produce a precursor polymer dispersion comprising particles of said water-soluble polymer at a level of prehydration;
   wherein, upon addition of a sufficient quantity of said precursor polymer dispersion to a final brine, said precursor polymer dispersion produces a second dispersion comprising a second concentration of final particles of said water-soluble polymer at a final level of hydration, said second concentration and said final level of hydration being effective at downhole conditions to maintain an effective level of a property of said final brine selected from the group consisting of rheology, fluid loss control, and a combination thereof.

9. The method of claim 8 wherein said one or more multivalent alkaline earth metals are divalent alkaline earth metals.

10. The method of claim 8 wherein said first concentration is from about 1 pound to about 2 pounds per gallon.

11. The method of claim 8 wherein said density is from about 9 to about 14 pounds per gallon.

12. The method of claim 8 wherein said density is from about 11 to about 13 pounds per gallon.

13. A method for producing a precursor polymer dispersion for addition to a final brine for use in drilling and completion operations comprising:
   providing a precursor brine comprising an aqueous solution comprising a salt selected from the group consisting of calcium chloride, calcium bromide, and combinations thereof, said aqueous solution comprising said salt at a first density of from about 9 to about 14 pounds per gallon; and mixing from about 0.5 to about 4 pounds per gallon of a water-soluble polymer with said precursor brine under first conditions sufficient to produce a precursor polymer dispersion comprising a first concentration of particles of said water-soluble polymer at a level of prehydration;

wherein, upon addition of a sufficient quantity of said precursor polymer dispersion to a final brine, said precursor polymer dispersion produces a second concentration of final particles of said water-soluble polymer at a final level of hydration, said second concentration and said final level of hydration being effective at downhole conditions to maintain an effective level of a property of said final brine selected from the group consisting of rheology, fluid loss control, and a combination thereof.

14. The method of claim 13 wherein said density is from about 11 to about 13 pounds per gallon.

15. A method for treating a high density brine for use in drilling and completion operations comprising.

providing a precursor brine comprising an aqueous solution comprising a salt consisting essentially of cations of one or more multivalent alkaline earth metals, said aqueous solution comprising said salt at a first density of from about 9 to about 14 pounds per gallon;

mixing about 1 to about 2 pounds per gallon of a water-soluble polymer with said precursor brine under first conditions sufficient to produce a precursor polymer dispersion comprising a first concentration of particles of said water-soluble polymer at a level of prehydration;

wherein, upon addition of a sufficient quantity of said precursor polymer dispersion to a final brine, said precursor polymer dispersion produces a second concentration of final particles of said water-soluble polymer at a final level of hydration, said second concentration and said final level of hydration being effective at downhole conditions to maintain an effective level of a property of said final brine selected from the group consisting of rheology, fluid loss control, and a combination thereof.

16. The method of claim 15 wherein said salt is selected from the group consisting of calcium chloride, calcium bromide, and combinations thereof.

17. The method of claim 15 wherein said one or more multivalent alkaline earth metals are divalent alkaline earth metals.

18. The method of claim 15 wherein said density is from about 11 to about 13 pounds per gallon.

19. A method for treating a high density brine for use in drilling and completion operations comprising:

providing a precursor brine having a first salt content;

mixing a water-soluble polymer with said precursor brine at a sufficient concentration and under conditions sufficient to produce a precursor polymer dispersion effective at a sufficient concentration in a final brine having a second salt content to improve a property of said final brine selected from the group consisting of rheology, fluid loss control, and a combination thereof; and mixing said sufficient concentration of said precursor polymer dispersion with said final brine.

20. The method of claim 19 wherein said salt is selected from the group consisting of calcium chloride, calcium bromide, and combinations thereof.

21. The method of claim 19 wherein said precursor brine comprises a salt selected from the group consisting of calcium chloride, calcium bromide, and combinations thereof; and said first salt content comprises a density of between about 9–14 pounds per gallon.

22. A precursor polymer dispersion comprising:

an aqueous solution of a salt at a first density, said salt comprising cations consisting essentially of cations of one or more multivalent alkaline earth metals; and a first concentration of particles of a water-soluble polymer at a level of prehydration;

wherein, addition of a sufficient quantity of said precursor polymer dispersion to a final brine comprising an aqueous solution of a second salt at a final density produces a final polymer dispersion comprising a second concentration comprising final particles of said water-soluble polymer at a final level of hydration, said second concentration and said final level of hydration being effective at downhole conditions to maintain an effective level of a property of said final brine selected from the group consisting of rheology, fluid loss control, and a combination thereof.

23. The dispersion of claim 22 wherein said first concentration is from about 0.5 to about 4 pounds per gallon.

24. The dispersion of claim 22 wherein said first concentration is from about 1 to about 2 pounds per gallon.

25. The dispersion of claim 22 wherein said density is in the range of from about 9 to about 14 pounds per gallon.

26. The dispersion of claim 22 wherein said density is from about 11 to about 13 pounds per gallon.

27. The dispersion of claim 22 wherein said salt is selected from the group consisting of calcium chloride, calcium bromide, and combinations thereof.

28. The dispersion of claim 23 wherein said salt is selected from the group consisting of calcium chloride, calcium bromide, and combinations thereof.

29. The dispersion of claim 24 wherein said salt is selected from the group consisting of calcium chloride, calcium bromide, and combinations thereof.

30. The dispersion of claim 25 wherein said salt is selected from the group consisting of calcium chloride, calcium bromide, and combinations thereof.

31. The dispersion of claim 26 wherein said salt is selected from the group consisting of calcium chloride, calcium bromide, and combinations thereof.

32. The dispersion of claim 22 wherein said one or more multivalent alkaline earth metals are divalent alkaline earth metals.

33. A method for producing a brine for use in drilling and completion operations comprising:

providing a precursor brine comprising an aqueous solution of a first salt at a first density, said first salt comprising cations consisting essentially of cations of one or more multivalent alkaline earth metals; and mixing a water-soluble polymer with said precursor brine at a first concentration and under first conditions, wherein said first density, said first concentration, and said first conditions are effective to produce a precursor polymer dispersion comprising particles of said water-soluble polymer at a level of prehydration;

wherein, addition of a sufficient quantity of said precursor polymer dispersion to a final brine comprising an aqueous solution of a second salt at a final density produces a final polymer dispersion comprising a second concentration comprising final particles of said water-soluble polymer at a final level of hydration, said second concentration and said final level of hydration being effective at downhole conditions to maintain an effective level of a property of said final brine selected from the group consisting of rheology, fluid loss control, and a combination thereof; and mixing said sufficient quantity of said precursor polymer dispersion with said final brine.

34. The method of claim 33 wherein said first concentration is from about 0.5 pounds to about 4 pounds per gallon.

35. The method of claim 34 wherein said first concentration is from about 1 pound to about 2 pounds per gallon.

36. The method of claim 33 wherein said first density is from about 9 to about 14 pounds per gallon.

37. The method of claim 34 wherein said first density is from about 9 to about 14 pounds per gallon.

38. The method of claim 35 wherein said first density is from about 9 to about 14 pounds per gallon.

39. The method of claim 33 wherein said first density is from about 11 to about 13 pounds per gallon.

40. The method of claim 34 wherein said first density is from about 11 to about 13 pounds per gallon.

41. The method of claim 35 wherein said first density is from about 11 to about 13 pounds per gallon.

42. The method of claim 33 wherein said one or more multivalent alkaline earth metals are divalent alkaline earth metals.

43. The method of claim 33 wherein said salt is selected from the group consisting of calcium chloride, calcium bromide, and combinations thereof.

44. The method of claim 34 wherein said salt is selected from the group consisting of calcium chloride, calcium bromide, and combinations thereof.

45. The method of claim 35 wherein said salt is selected from the group consisting of calcium chloride, calcium bromide, and combinations thereof.

46. The method of claim 37 wherein said salt is selected from the group consisting of calcium chloride, calcium bromide, and combinations thereof.

47. The method of claim 40 wherein said salt is selected from the group consisting of calcium chloride, calcium bromide, and combinations thereof.

48. A precursor polymer dispersion comprising:

a precursor brine comprising an aqueous solution of a first salt at first density, said first salt comprising cations consisting essentially of cations of one or more multivalent alkaline earth metals;

a precursor polymer dispersion in said precursor brine comprising a first concentration of particles of a water-soluble polymer at a level of prehydration;

wherein, mixing of a sufficient quantity of said precursor polymer dispersion with a final brine comprising an aqueous solution of a second salt at a final density produces a second concentration of final particles of said water-soluble polymer at a final level of hydration, said second concentration and said final level of hydration being effective at downhole conditions to maintain an effective level of a property of said final brine selected from the group consisting of rheology, fluid loss control, and a combination thereof.

49. The precursor polymer dispersion of claim 48 wherein said one or more multivalent alkaline earth metals are divalent alkaline earth metals.

* * * * *